(12) United States Patent
Sasai et al.

(10) Patent No.: US 11,534,352 B2
(45) Date of Patent: Dec. 27, 2022

(54) MOVING VEHICLE

(71) Applicant: PANASONIC CORPORATION, Osaka (JP)

(72) Inventors: Hiroyuki Sasai, Osaka (JP); Hiroyuki Uematsu, Osaka (JP); Takeshi Ando, Kyoto (JP); Noriaki Imaoka, Tokyo (JP); Duyhinh Nguyen, Chiba (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 276 days.

(21) Appl. No.: 16/956,202

(22) PCT Filed: Nov. 28, 2018

(86) PCT No.: PCT/JP2018/043720
§ 371 (c)(1),
(2) Date: Jun. 19, 2020

(87) PCT Pub. No.: WO2019/124005
PCT Pub. Date: Jun. 27, 2019

(65) Prior Publication Data
US 2020/0330296 A1 Oct. 22, 2020

(30) Foreign Application Priority Data
Dec. 22, 2017 (JP) .............................. JP2017-246189

(51) Int. Cl.
*A61G 5/10* (2006.01)
*A61G 5/04* (2013.01)

(52) U.S. Cl.
CPC ................ *A61G 5/10* (2013.01); *A61G 5/041* (2013.01)

(58) Field of Classification Search
CPC ............. A61G 5/04; A61G 5/041; A61G 5/10
See application file for complete search history.

(56) References Cited

U.S. PATENT DOCUMENTS

| 8,565,982 B2 * | 10/2013 | Lofstrand | B60N 2/0745 280/35 |
| 8,676,420 B2 * | 3/2014 | Kume | G05D 1/024 701/22 |

(Continued)

FOREIGN PATENT DOCUMENTS

| JP | 2003-334218 A | 11/2003 |
| JP | 2007-143859 A | 6/2007 |

(Continued)

OTHER PUBLICATIONS

The Extended European search report issued in European Patent Application No. 18892742.0 dated Dec. 4, 2020.

(Continued)

*Primary Examiner* — Philip F Gabler
(74) *Attorney, Agent, or Firm* — Pearne & Gordon LLP

(57) ABSTRACT

Provided is a moving vehicle which enables a user to easily recognize that the moving vehicle is stopped due to the user's own clothing or the like being determined as an object, thereby enabling the user to cancel the stopped state and return to a moving state. A moving vehicle on which a person rides and which stops moving if the distance to an object is equal to or less than a first predetermined value, said moving vehicle comprising: a sensor (124) for detecting the distance; a determiner (125) for determining, if the distance is equal to or less than a second predetermined value smaller than the first predetermined value, a state in which the field of view of the sensor (124) is blocked due to the clothing covering the sensor (124); and a notifier (128) that, if said state is determined by the determiner (125), issues a notification.

8 Claims, 4 Drawing Sheets

(56) References Cited

U.S. PATENT DOCUMENTS

| | | | | |
|---|---|---|---|---|
| 8,677,524 | B2* | 3/2014 | Kume | G05D 1/0227 |
| | | | | 5/613 |
| 9,229,450 | B2* | 1/2016 | Oshima | G05D 1/021 |
| 10,599,157 | B2* | 3/2020 | Oshima | A61G 5/04 |
| 10,646,387 | B2* | 5/2020 | Sasai | A61G 5/128 |
| 2011/0130940 | A1* | 6/2011 | Smithers | G05D 1/0055 |
| | | | | 701/99 |
| 2015/0066274 | A1* | 3/2015 | Hijikata | B62B 5/0073 |
| | | | | 180/19.1 |
| 2019/0049977 | A1* | 2/2019 | Dean | G05D 1/0225 |

FOREIGN PATENT DOCUMENTS

| | | |
|---|---|---|
| JP | 2011-177205 A | 9/2011 |
| JP | 2015-154608 A | 8/2015 |
| JP | 2018-117836 A | 8/2018 |

OTHER PUBLICATIONS

International Search Report Issued in Patent Application No. PCT/JP2018/043720 dated Mar. 5, 2019.
Written Opinion Issued in Patent Application No. PCT/JP2018/043720 dated Mar. 5, 2019.

* cited by examiner

MOVING VEHICLE

TECHNICAL FIELD

The present invention relates to a mobile vehicle having a function to detect an object.

BACKGROUND ART

Some electric wheelchairs (mobile vehicles) have not only a function to travel according to human operation, but also a function to detect an obstacle with an obstacle detection sensor and automatically stop the travelling of the electric wheelchair. For example, PTL 1 discloses a travelling control method for an electric wheelchair that enables precise operation.

In this travelling control method, information regarding the presence or absence of an obstacle is input from the obstacle detection sensor to a travel allowance determination means. When an obstacle is detected, an alarm issue instruction is provided to an alarm issue means and a stop instruction is provided to a motor drive means that drives the motor and by extension the drive wheel. As a result, the electric wheelchair is temporarily stopped, and a collision with an obstacle is avoided. Thereafter, when an travel instruction in the same direction as before the stop (i.e., the direction in which the obstacle has been detected) is again received, a travel allowance (instruction) is issued to the motor drive means to allow travelling while again sending the alarm issue instruction to the alarm issue means.

PTL 1 also discloses a configuration of an electric wheelchair for achieving the above operation. PTL 1 discloses a configuration in which an obstacle detection sensor is disposed in the main body of the electric wheelchair at a frontmost portion of the seat surface.

With such a configuration, the electric wheelchair can avoid a collision by temporarily stopping when an obstacle is detected in the proximity or in front of the electric wheelchair. Further, when again receiving a travel instruction to in the same direction as before a stop, the electric wheelchair allows movement (travel) while alerting the user. This allows the electric wheelchair to travel to the proximity of the obstacle without disengaging the obstacle detection sensor or without following any special operating procedures.

CITATION LIST

Patent Literature

PTL 1: Japanese Patent Application Laid-Open No. 2011-177205

SUMMARY OF INVENTION

Technical Problem

In the electric wheelchair disclosed in PTL 1, however, the obstacle detection sensor is disposed at the frontmost portion of the seat surface of the electric wheelchair body. As such, when the seated user actually operates the electric wheelchair, the obstacle detection sensors may detect the user's legs as an obstacle in the case where the user is large. For example, when the electric wheelchair is shared in a public space, the same electric wheelchair may be used by different users. In this case, the possibility of the above-mentioned situation may be high due to differences in body size and boarding posture. It is also conceivable that clothing may cover the obstacle detection sensor and that the obstacle detection sensor may detect the clothing as an obstacle.

When the user's leg or clothing is detected as an obstacle by the obstacle detection sensor as described above, the electric wheelchair will automatically stop. Usually, users are not aware of their legs, clothing or the like as an obstacle. Consequently, it is difficult to recognize what is causing the electric wheelchair to stop, and it is difficult to release the stopped state and return to a travelling state.

As described above, the electric wheelchair disclosed in PTL 1 may detect the user's leg or clothing in the proximity of the electric wheelchair as an obstacle, and, when receiving this information, the electric wheelchair may unnecessarily stop.

An object of the present invention is to provide a mobile vehicle that enables the user to easily recognize that the mobile vehicle has stopped because of his or her clothing determined to be an obstacle such that the user can release the stopped state and return to the travelling state.

Solution to Problem

To solve the above-mentioned problems, a mobile vehicle of an embodiment of the present invention, which carries a person and temporarily stops a movement when a distance to an object is less than or equal to a first predetermined value, includes a sensor that detects the distance to the object; a determiner that determines that a view of the sensor is obstructed by clothing worn by the person or the like covering the sensor when the distance to the object is less than or equal to a second predetermined value; and a notifier that makes a notification that indicates that the view of the sensor is obstructed by the clothing worn by the person or the like covering the sensor when the determiner determines that the view of the sensor is obstructed by the clothing worn by the person or the like covering the sensor.

Advantageous Effects of Invention

The present invention solves a known problem in which a mobile vehicle cannot be used because the user cannot recognize the cause of the stoppage when the mobile vehicle stops when the sensor detects an object in the proximity of the mobile vehicle. Specifically, the determiner determines that an object that the user cannot easily assume as an obstacle, such as the user's leg or clothing, has been detected as an obstacle in the proximity of a mobile vehicle, and the notifier notifies the user of that fact based on the determination. Thus, the present invention can provide a mobile vehicle that is easy to use.

BRIEF DESCRIPTION OF DRAWINGS

FIG. 2 is a schematic plan view illustrating a region (proximity determination region) where a determiner of the electric vehicle of the embodiment of the present invention detects a user's feet, clothing or the like;

FIG. 4 is a schematic plan view illustrating a region (proximity determination region) where a determiner of an electric vehicle of a modification of the embodiment of the present invention detects a user's feet, clothing or the like.

DESCRIPTION OF EMBODIMENTS

Hereinafter, an embodiment of the present invention (hereinafter referred to also as "present embodiment") is described with reference to the drawings. Note that the same components are denoted with the same reference sign, and the description thereof may be omitted. In addition, the drawings are schematically illustrated for ease of understanding. In the following embodiment, an example is described in which the mobile vehicle of the embodiment of the present invention is applied to electric wheelchair (hereinafter referred to as an "electric vehicle") 100. In the following description, the front of user 1 (passenger) on board electric vehicle 100 is set as the front, and the opposite side is set as the rear, and, the horizontal direction orthogonal to the front and rear directions is set as the width direction. In addition, when the term "user" is used, user 1 is assumed to be on board electric vehicle 100, unless otherwise explained.

Embodiment

Configuration of Electric Vehicle

Figure 1:
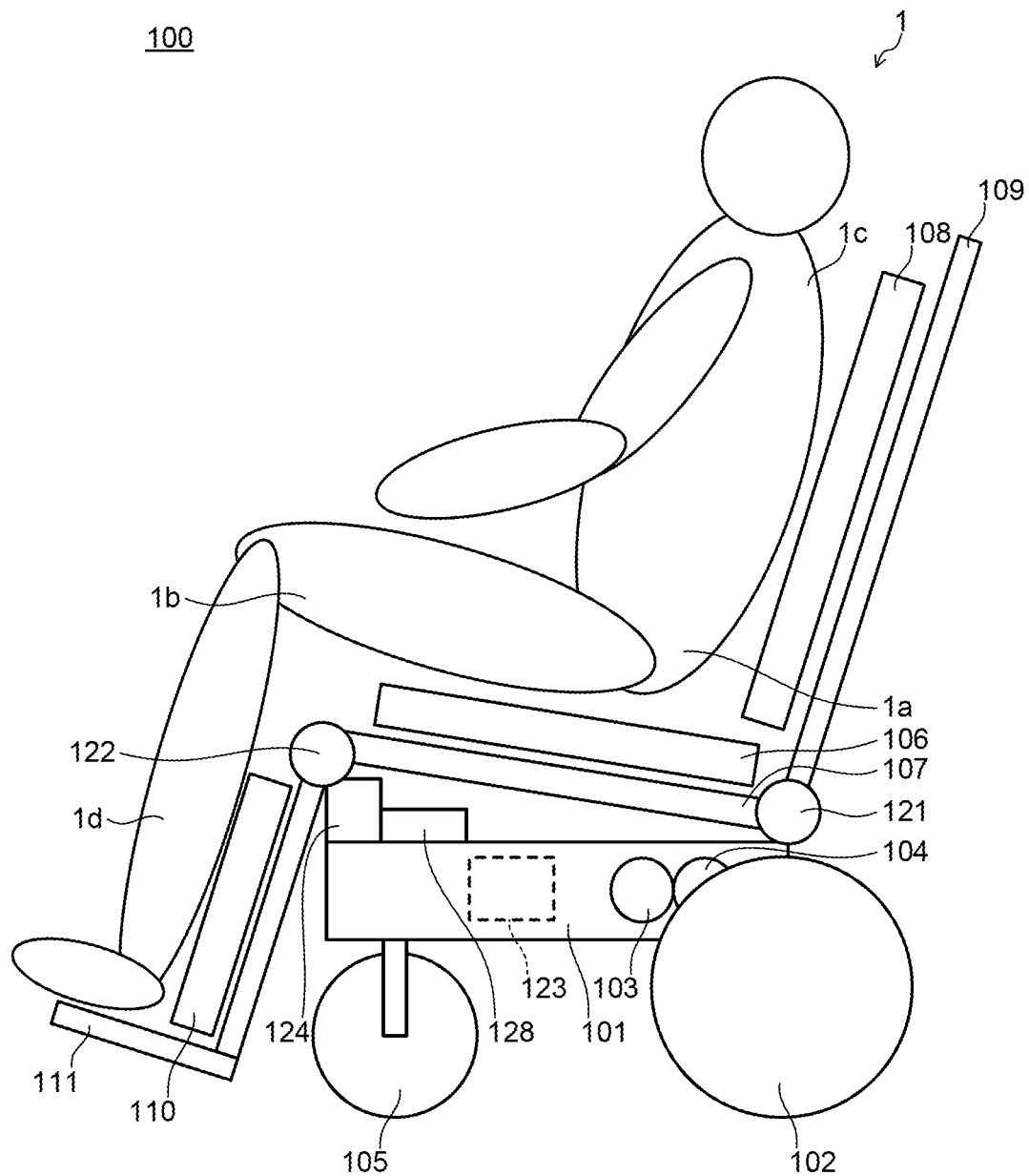
FIG. 1 is a schematic side view of an electric vehicle of an embodiment of the present invention.

FIG. 1 is a schematic side view of electric vehicle 100 of the present embodiment. Electric vehicle 100 of the present embodiment illustrated in FIG. 1 includes a pair of left and right drive wheels 102, a pair of left and right auxiliary wheels 105, main frame 101, electric motor 103, a battery (not illustrated), operation controller 104, and light emitter 128. The pair of left and right drive wheels 102 are rotatably attached to main frame 101. The pair of left and right auxiliary wheels 105 are provided as steering wheels. Main frame 101 is supported by the drive wheels 102 and the auxiliary wheels 105. Electric motor 103 and the battery are built in main frame 101. Electric motor 103 is a drive source of drive wheel 102. The battery drives electric motor 103. Operation controller 104 controls the movement of electric vehicle 100. Light emitter 128 emits light in response to a light-emitting command from operation controller 104. Operation controller 104 and light emitter 128 will be described later with reference to FIG. 3.

In addition, electric vehicle 100 includes seat frame 107, seat back frame 109, footrest frame 111, actuators 121 and 122, and seating position conversion controller 123. When user 1 is on board, seat frame 107 further supports seating seat 106 that supports buttock 1$a$ and thigh 1$b$ of user 1. When user 1 is on board, seat back frame 109 further supports backrest 108 that supports back 1$c$ of user 1. When user 1 is on board, footrest frame 111 further supports footrest 110 that supports leg 1$d$ of user 1. Actuator 121 changes the angles of seat back frame 109 and seat frame 107. Actuator 122 changes the angles of footrest frame 111 and seat frame 107. Seating position conversion controller 123 controls actuator 121 and actuator 122 individually.

Further, drive wheel 102 and auxiliary wheel 105 are on the ground not illustrated. In addition, in FIG. 1, for convenience, gaps are illustrated between user 1 and electric vehicle 100, between seating seat 106 and seat frame 107, between backrest 108 and seat back frame 109, and between footrest 110 and footrest frame 111.

Figure 2:
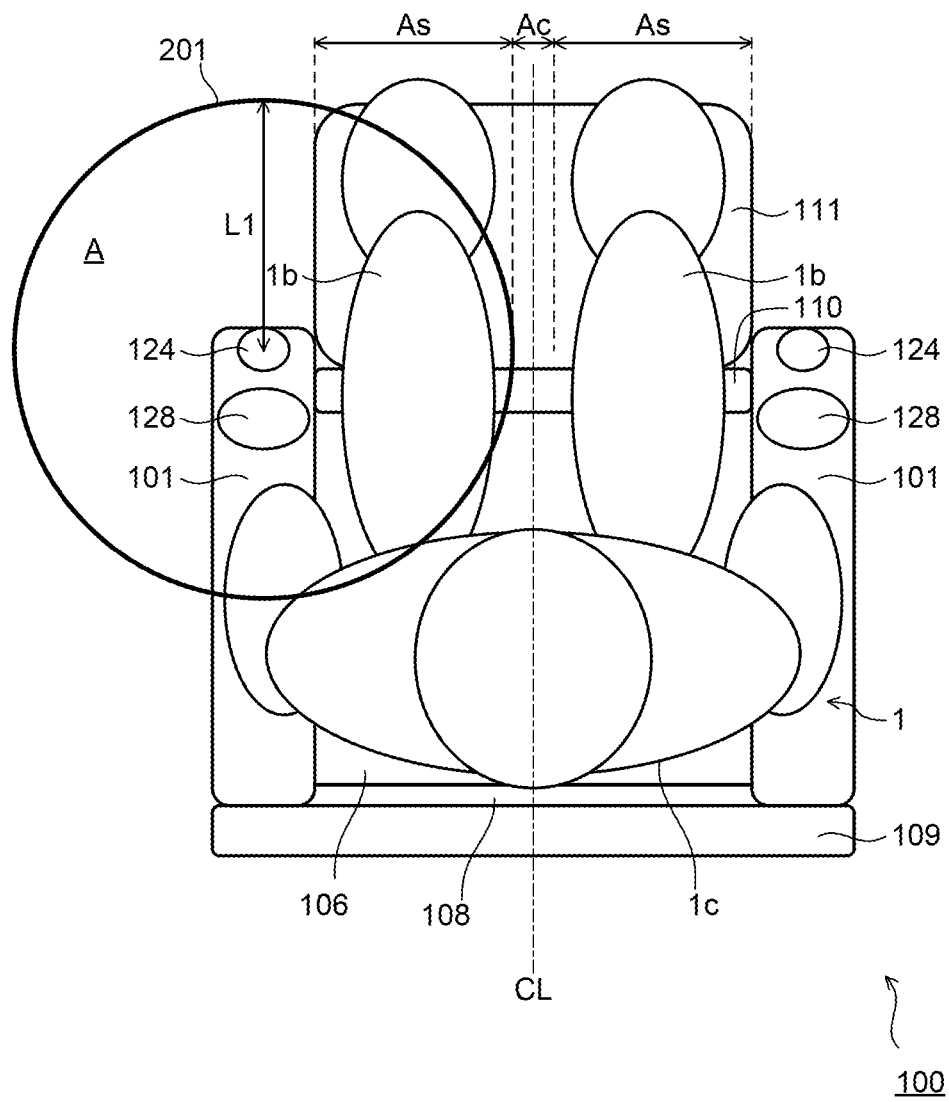

FIG. 2 is an upper view (plan view) of electric vehicle 100, and a schematic plan view illustrating a region (proximity determination region) where a determiner of the electric vehicle determines that the user's feet, clothing or the like has been detected. As illustrated in FIG. 2, obstacle detection sensor 124 and light emitter 128 are disposed on the upper surface of left and right main frames 101. The obstacle detection ranges of obstacle detection sensors 124 disposed on both sides of electric vehicle 100 are set to overlap each other at the front of electric vehicle 100.

In electric vehicle 100 having the above-mentioned configuration, when user 1 on board electric vehicle 100 moves by operating electric vehicle 100, obstacle detection sensor 124 senses whether there is an object such as an obstacle in the proximity of electric vehicle 100. Obstacle detection sensor 124 may be a laser sensor, an ultrasonic sensor, a radar, or the like, and is not limited as long as an object can be sensed.

Control Configuration

Figure 3:
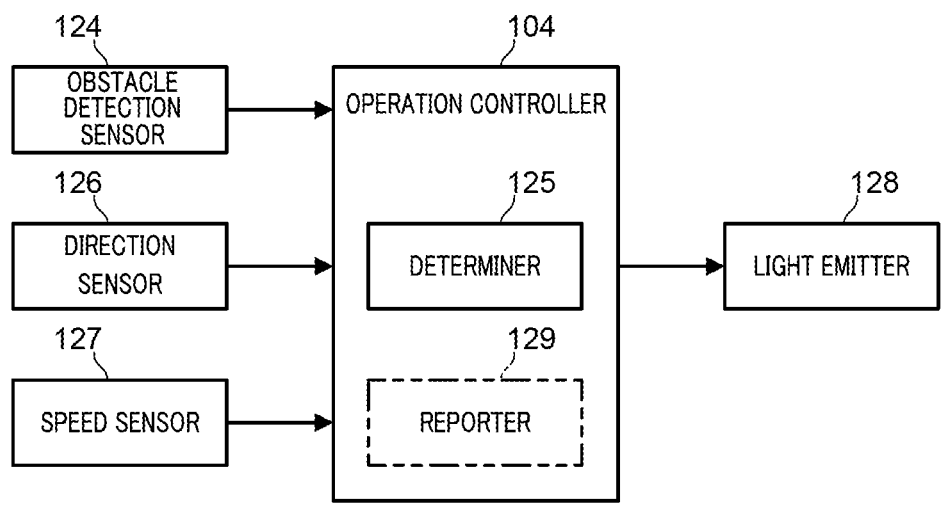
FIG. 3 is a schematic functional block diagram illustrating a configuration of an operation controller of the embodiment of the present invention.

FIG. 3 is a schematic functional block diagram illustrating a configuration of the operation controller of the embodiment of the present invention. It should be noted that reporter 129 illustrated by the double-dotted chain line in FIG. 3 will be described later in a modification example. As illustrated in FIG. 3, operation controller 104 is provided with determiner 125. Determiner 125 is connected to obstacle detection sensor 124, direction sensor 126 that detects the movement direction of electric vehicle 100, and speed sensor 127 that detects the speed of electric vehicle 100, and determiner 125 receives an output value from obstacle detection sensor 124, an output value from direction sensor 126, and an output value from speed sensor 127, and makes a determination described later based on the output values.

When obstacle detection sensor 124 detects an obstacle, it transmits, to determiner 125, information such as distance L to the detected obstacle. Determiner 125 stores threshold distance L0 (the first predetermined value) for determining whether electric vehicle 100 is likely to collide with an obstacle. Determiner 125 compares distance L between electric vehicle 100 and the obstacle with threshold distance L0 on the basis of the information regarding the obstacle received from obstacle detection sensor 124, and determines whether there is a risk of collision with the obstacle. In the determination of collision, the speed of electric vehicle 100 output from speed sensor 127, the movement direction of electric vehicle 100 output from direction sensor 126 and the like may also be taken into account.

For example, in the case where an obstacle is present in the direction that electric vehicle 100 is moving, and electric vehicle 100 moves closer to the obstacle, and, distance L from the obstacle becomes shorter than threshold distance L0 (L<L0) set in determiner 125, determiner 125 transmits a stop command to operation controller 104. Operation controller 104 that has received the stop command stops electric vehicle 100. Thus, collision between electric vehicle 100 and the obstacle is avoided.

On the other hand, when obstacle detection sensor 124 detects the clothing of user 1 or the like as an obstacle in the extreme proximity of electric vehicle 100 and electric vehicle 100 stops, it is difficult for user 1 to recognize that his or her own clothing is the cause of the stoppage of electric vehicle 100.

For this reason, proximity determination region 201 (see FIG. 2), which is a region having a circular shape (hereinafter referred to as a "circular region") around obstacle detection sensor 124 in plan view, is set around electric vehicle 100 for each obstacle detection sensor 124. When obstacle detection sensor 124 detects an object that is presumably an obstacle, determiner 125 determines whether the object is located in proximity determination region 201.

In other words, determiner 125 determines whether distance L is not greater than predetermined value L1 (second predetermined value) that defines proximity determination region 201 on the basis of the detection result of obstacle detection sensor 124. Then, when distance L is less than or equal to predetermined value L1, determiner 125 determines that the view of obstacle detection sensor 124 is obstructed (hereinafter referred to as "shielded state") by the user's clothing covering obstacle detection sensor 124. Note that when distance L is less than or equal to predetermined value L1 continuously for a predetermined period of time, determiner 125 may determine that obstacle detection sensor 124 is in a shielded state.

Here, proximity determination region 201 is, for example, a circular region with a radius of predetermined value L1 with an obstacle detection sensor 124 as a center. Predetermined value L1 is set to a value smaller than threshold distance L0 for determining whether there is a risk of collision with an obstacle.

When determiner 125 determines that an object exists in proximity determination region 201, determiner 125 transmits a light emission command (control command) to light emitter 128. Upon receipt of the light-emitting command, light emitter 128 begins light emission to notify user 1 that user 1 is in a shielded state, that is, that user 1's clothing may have been detected as an obstacle in the proximity of electric vehicle 100.

In the present embodiment, proximity determination region 201 is, for example, region A including at least a part of thigh 1b of user 1 as illustrated in FIG. 2. More specifically, for example, it is a region that is located on the side of the seating surface (upper surface) of seating seat 106 and includes at least a portion of outer edge portion As in the width direction and does not include center portion Ac in the width direction.

Here, center portion Ac is a portion including width direction center line CL in seating seat 106, and outer edge portion As is a portion outside (the side away from width direction center line CL) center portion Ac in seating seat 106. In FIG. 2, for convenience, proximity determination region 201 is illustrated only for obstacle detection sensors 124 on one side in the left and right direction, but proximity determination region 201 is set for obstacle detection sensors 124 on both sides in the left and right direction.

Figure 4:
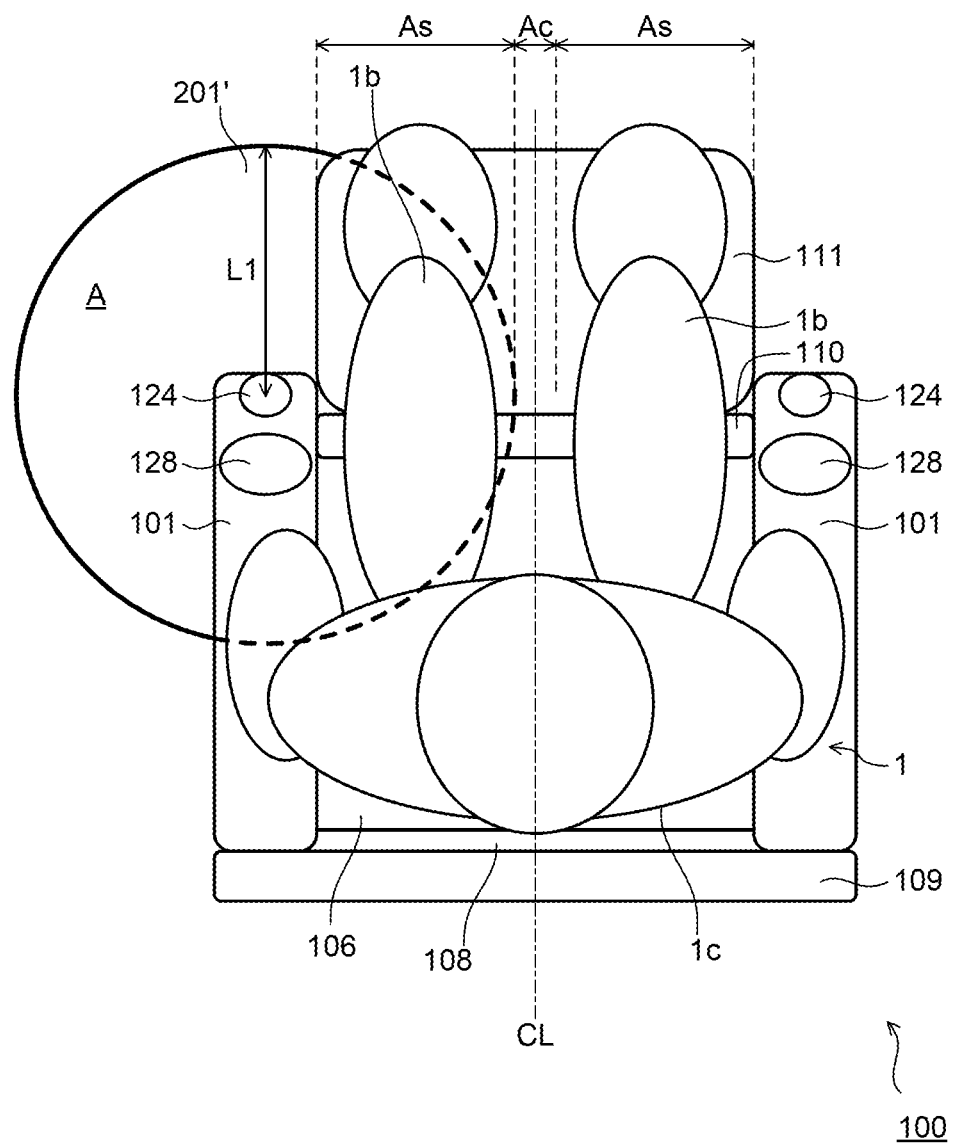

As illustrated in FIG. 2, proximity determination region 201 is a circular region around obstacle detection sensor 124 in plan view, but it does not necessarily have to be a circular region. A region where clothing, which is difficult for the user to recognize as an obstacle, is likely to be misdetected as an obstacle by obstacle detection sensor 124 is a region where detection for the obstacle should be avoided. However, there are many cases where this area is outside (the side away from seating seat 106, in other words, the side away from the centerline CL in the width direction of electric vehicle 100) the pair of left and right obstacle detection sensors 124. For this reason, obstacle detection sensor 124 may have an outward directionality instead of proximity determination region 201. For example, it may be as illustrated in FIG. 4. FIG. 4 is a schematic plan view illustrating a region (proximity determination region) where the determiner of the electric vehicle in a modification of the embodiment of the present invention determines that a user's leg, clothing or the like has been detected. The shape of the proximity determination region may be similar to the shape of proximity determination region 201' illustrated by the solid line in FIG. 4, in which the inside (seating seat 106 side) of main frame 101 of the circle area is trimmed off in plan view.

In addition, in the case where the characteristics of user 1, such as whether the user is an adult or a child, the characteristics of clothing such as a skirt or trousers and the like, are known in advance as data of user 1, at least one of the shape of proximity determination region 201 and the size of proximity determination region 201 may be changed in accordance with the risk of covering of obstacle detection sensor 124 with clothing or a leg. In other words, predetermined value L1 that defines proximity determination region 201 may be changed.

For example, in the case of a child whose height is short, the legs are often shorter and the body shape is different from that of an adult, and therefore predetermined value L1, or by extension, proximity determination region 201, may be set to a smaller value. In order to change at least one of the shape and size of proximity determination region 201, a device (inputter) for inputting at least one of the user's body type, whether the user is an adult, the user's age, and the type of user's clothing may be provided, and at least one of the shape and size of proximity determination region 201 may be changed in accordance with to the input. As a specific example, a selector composed of multiple switches corresponding to body types may be provided.

In addition, the determination conditions of determiner 125 are not limited to those described above. For example, when clothing or the like is present in proximity determination region 201, the clothing is considered not to largely move (in a fixed state). Therefore, in order to distinguish between a non-fixed obstacle and fixed clothing or the like, determiner 125 may determine that, when detection in proximity determination region 201 is made continuously for a certain period of time or more, covering with clothing or the like is the cause of the detection. Note that, even when determiner 125 determines that the clothing or the like of user 1 exists in proximity determination region 201, determiner 125 transmits a stop command to operation controller 104, and as a result, operation controller 104 stops electric vehicle 100.

It should be noted that the clothing is considered to be microscopically moving in a wavering manner while the clothing is considered to be fixed (static) in proximity determination region 201. For this reason, on the condition that the distance to an object detected by obstacle detection sensor 124 is varying, determiner 125 may determine such an object to be clothing. In other words, the notification may be made under the condition of the above-mentioned variation of the distance.

When the clothing covers obstacle detection sensor 124, the clothing usually extends downward in the vertical direction, and therefore value L1 may be set to a distance that is close to obstacle detection sensor 124. However, when only the tip of clothing covers obstacle detection sensor 124, the tip of the clothing may have an angle from the vertical direction, and such an angle may empirically ranges up to about 45 degrees. In the case where the height of obstacle detection sensor 124 is 5 cm, predetermined value L1 may be set such that proximity determination region 201 is the same as or narrower than the region obtained by extending the projection region of obstacle detection sensor 124 (including the cover) by 5 cm to the outside in the scanning plane. In other words, predetermined value L1 may be set such that proximity determination region 201 is the same as or narrower than the region obtained by extending, by 5 cm to the outside, the projection region of the entire obstacle detection sensor 124 projected on a flat surface.

According to the present embodiment, with obstacle detection sensor 124, when clothing or the like of user 1 is present in proximity determination region 201 of the proximity of electric vehicle 100, it is possible to notify user 1 that the clothing is present in proximity determination region 201 of the proximity of electric vehicle 100 through light emission of light emitter 128.

The notification to user 1 in present embodiment may be made only when user 1 is on board. For example, a boarding sensor configured to detect boarding of user 1 may be provided on the seating surface of electric vehicle 100, and a notification may be made on the condition that the boarding of user 1 is detected by the boarding sensor. Alternatively, determiner 125 may determine whether the clothing or the like of user 1 is present in proximity determination region 201 on the condition that boarding of user 1 has been detected by the boarding sensor. The boarding sensor is, for example, a pressure sensitive sensor that detects boarding of user 1 on the basis of pressure.

With known technology, it is difficult for user 1 to recognize that the clothing of user 1 has been detected as an obstacle by obstacle detection sensor 124. With electric vehicle 100 of the present embodiment, this (i.e., the fact that the clothing of user 1 has been detected as an obstacle by obstacle detection sensor 124) can be recognized. This recognition allows user 1 to change the position of the clothing, the leg and the like such that user 1 can move using electric vehicle 100 by avoiding the needless stopping of electric vehicle 100 even when an obstacle is detected.

Although light emitter 128 is used here as a notification means to user 1, the notification means is not limited to this. As long as user 1 can be notified, the notification means may be a notification means using the sense of sight, the sense of hearing, the sense of touch and the like. For example, the notification means may be a means that uses letters, images and the like to indicate the presence of an obstacle in the proximity of the electric vehicle, a means that generates sounds to alert the user or generates words to make a notification, or the like. Alternatively, the notification means may be a means that makes a notification by vibrating a part of the electric vehicle or the like. In addition, the above-mentioned clothing notification means provided with the proximity determination region may also be applied to electric wheelchairs of different models regardless of the configuration (wheels, frame and the like) of the electric wheelchair.

Modification Example

As illustrated in FIG. 3 by the two-dotted chain line, reporter 129 for providing a report that the clothing worn by user 1 has been removed from the view of obstacle detection sensor 124 may be provided. Specifically, in the case where the object is no longer detected by obstacle detection sensor 124 after a notification is made by light emitter 128, determiner 125 may determine that the clothing worn by user 1 has been removed from the view of obstacle detection sensor 124 and reporter 129 may make a report of that determination.

All the disclosures in the specifications, drawings and abstracts contained in the Japanese application of Patent Application 2017-246189 filed on Dec. 22, 2017 are incorporated herein by reference.

INDUSTRIAL APPLICABILITY

The electric vehicle of the embodiment of the present invention is useful in the fields where the active use of electric vehicles is required in indoor and outdoor public spaces, as well as in the fields of nursing care, welfare and the like.

REFERENCE SIGNS LIST

1 User
1*a* Buttock
1*b* Thigh
1*c* Back
1*d* Leg
100 Electric vehicle
101 Main frame
102 Drive wheel
103 Electric motor
104 Operation controller
105 Auxiliary wheel
106 Seating seat
107 Seat frame
108 Backrest
109 Seat back frame
110 Footrest
111 Footrest Frame
121 Actuator
122 Actuator
123 Seating position conversion controller
124 Obstacle detection sensor (Sensor that detects distance to object)
125 Determiner
126 Direction sensor
127 Speed sensor
128 Light emitter (Notifier)
129 Reporter
201, 201' Proximity determination region

What is claimed is:

1. A mobile vehicle configured to carry a passenger and temporarily stops a movement when a distance to an object is less than or equal to a first predetermined value, the mobile vehicle comprising:
   a sensor that detects the distance to the object;
   a determiner that determines that a view of the sensor is obstructed due to the passenger covering the sensor when the distance to the object is less than or equal to a second predetermined value; and
   a notifier that makes a notification that indicates that the view of the sensor is obstructed due to the passenger covering the sensor when the determiner determines that the view of the sensor is obstructed due to the passenger covering the sensor.

2. The mobile vehicle according to claim 1, wherein the second predetermined value is set such that a proximity determination region defined by the second predetermined value is the same as or narrower than a region obtained by extending a periphery of the sensor by 5 cm.

3. The mobile vehicle according to claim 1, wherein the determiner determines that the view of the sensor is obstructed due to the passenger the sensor when the distance to the object is less than or equal to the second predetermined value continuously for a time longer than a first predetermined time.

4. The mobile vehicle according to claim 1, wherein the notifier makes the notification using sound.

5. The mobile vehicle according to claim 1, wherein a proximity determination region defined by the second predetermined value is set from the sensor in a direction opposite to a direction in which the passenger exists.

6. The mobile vehicle according to claim 1, further comprising a boarding sensor, wherein
the notification is made only when boarding is detected by the boarding sensor.

7. The mobile vehicle according to claim 1, wherein the notification is made when the distance to the object detected by the sensor varies and is less than or equal to the second predetermined value.

8. The mobile vehicle according to claim 1, further comprising an inputter that accepts a change of the second predetermined value, wherein
a selector configured to select a type of a body shape and to change the second predetermined value on a basis of the body shape is provided as the inputter.

* * * * *